(12) United States Patent
Nammi et al.

(10) Patent No.: US 9,742,480 B1
(45) Date of Patent: Aug. 22, 2017

(54) CHANNEL-STATE INFORMATION DETERMINATION IN WIRELESS NETWORKS

(71) Applicant: Futurewei Technologies, Inc., Plano, TX (US)

(72) Inventors: Sairamesh Nammi, Bedminster, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/164,373

(22) Filed: May 25, 2016

(51) Int. Cl.
*H04B 7/02* (2017.01)
*H04B 7/06* (2006.01)
*H04B 7/0456* (2017.01)
*H04L 25/02* (2006.01)

(52) U.S. Cl.
CPC ......... *H04B 7/0626* (2013.01); *H04B 7/0456* (2013.01); *H04L 25/0228* (2013.01)

(58) Field of Classification Search
CPC .. H04B 7/0626; H04B 7/0456; H04L 25/0228
USPC ........................................ 375/267
See application file for complete search history.

(56) References Cited

U.S. PATENT DOCUMENTS

| | | | | |
|---|---|---|---|---|
| 8,611,448 B2* | 12/2013 | Erell | .................... | H04B 7/0417 375/219 |
| 8,743,992 B2* | 6/2014 | Enescu | ................ | H04B 7/0486 370/334 |
| 8,976,779 B2* | 3/2015 | Yie | ...................... | H04B 7/0639 370/350 |
| 2005/0157808 A1* | 7/2005 | Ihm | ...................... | H04B 7/0634 375/267 |
| 2009/0110114 A1* | 4/2009 | Onggosanusi | ....... | H04B 7/0417 375/299 |
| 2012/0076028 A1* | 3/2012 | Ko | ........................ | H04L 1/0026 370/252 |
| 2012/0257664 A1* | 10/2012 | Yue | ...................... | H04B 7/0452 375/227 |
| 2013/0003812 A1* | 1/2013 | Collotta | ............... | H04B 7/0417 375/227 |
| 2013/0028068 A1* | 1/2013 | Park | .................... | H04B 7/0478 370/203 |
| 2013/0265972 A1* | 10/2013 | Shirani-Mehr | ....... | H04W 52/34 370/329 |
| 2014/0205031 A1* | 7/2014 | Nammi | ................ | H04B 7/0413 375/267 |
| 2015/0078472 A1* | 3/2015 | Vook | ................... | H04B 7/0617 375/267 |

* cited by examiner

*Primary Examiner* — Helene Tayong
(74) *Attorney, Agent, or Firm* — Schwegman Lundberg & Woessner, P.A.

(57) ABSTRACT

A method for channel-state information determination in a wireless network comprises determining an initial channel-state information for a wireless channel based on a search of a plurality of sets of precoding codebook elements stored in a multiple input multiple output user equipment (UE) and determining a subsequent channel-state information based on the initial channel-state information.

15 Claims, 5 Drawing Sheets

CHANNEL-STATE INFORMATION DETERMINATION IN WIRELESS NETWORKS

TECHNICAL FIELD

The present disclosure is related generally to wireless networks and in particular to determining channel-state information, such as rank information, in a wireless network.

BACKGROUND

The Third Generation Partnership Project (3GPP) Long Term Evolution (LTE) radio interface supports both Frequency division duplex (FDD) and Time division duplex (TDD). A multiple input multiple output (MIMO) technique is an advanced antenna technique for a wireless device to improve spectral efficiency and thereby boost overall system capacity of 3GPP LTE systems. MIMO may be used for achieving diversity gain, spatial multiplexing gain and beamforming gain. Massive MIMO systems (i.e., 64+ antennas) are currently under investigation for 5G systems.

Ideal linear precoding uses full channel-state information (CST) at the transmitter. This may be possible only for TDD-based systems but not practical for FDD-based systems. Codebook based precoding, allows the receiver to explicitly identity a precoding matrix/vector based on a codebook that should be used for transmission. In the 3GPP LTE standard, separate codebooks are defined for various combinations of the number of transmit antennas and the number of transmission layers. The latter is also called rank information (RI).

For reporting RI and associated precoding matrix index (PMT), the user equipment (UE) uses an exhaustive search over all the precoding codebook elements. The exhaustive search is difficult to implement with the increased number of transmit antennas in massive MIMO systems. For example, in systems with four transmit antenna ports, the UE needs to search over all the 64 precoding entities for finding rank information and precoding index. Similarly, for 8 transmit antennas, the UE needs to search over all the 122 elements defined in the 3GPP standard. With large scale MEMO, the codebook size becomes larger. Thus, the UE complexity increases with additional transmit antennas deployed at the eNode B. Also, frequent CSI computation drains the UE battery by increasing power consumption, consuming more memory, and using additional processing units at the UE.

SUMMARY

A method for channel-state information determination in a wireless network comprises determining an initial channel-state information for a wireless channel based on a search of a plurality of sets of precoding codebook elements stored in a multiple input multiple output user equipment (UE) and determining a subsequent channel-state information based on the initial channel-state information.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The various embodiments operate in wireless communication systems such as mmWave, Institute of Electrical and Electronics Engineers (IEEE) 802.11 standards-based systems, future $3^{rd}$ Generation Partnership Project (3GPP) 5G systems based on mmWave as well as other wireless systems. For simplicity, subsequent descriptions refer to communications at the user equipment (UE). However, other embodiments may be applied to communications at the base station as well.

Figure 1:
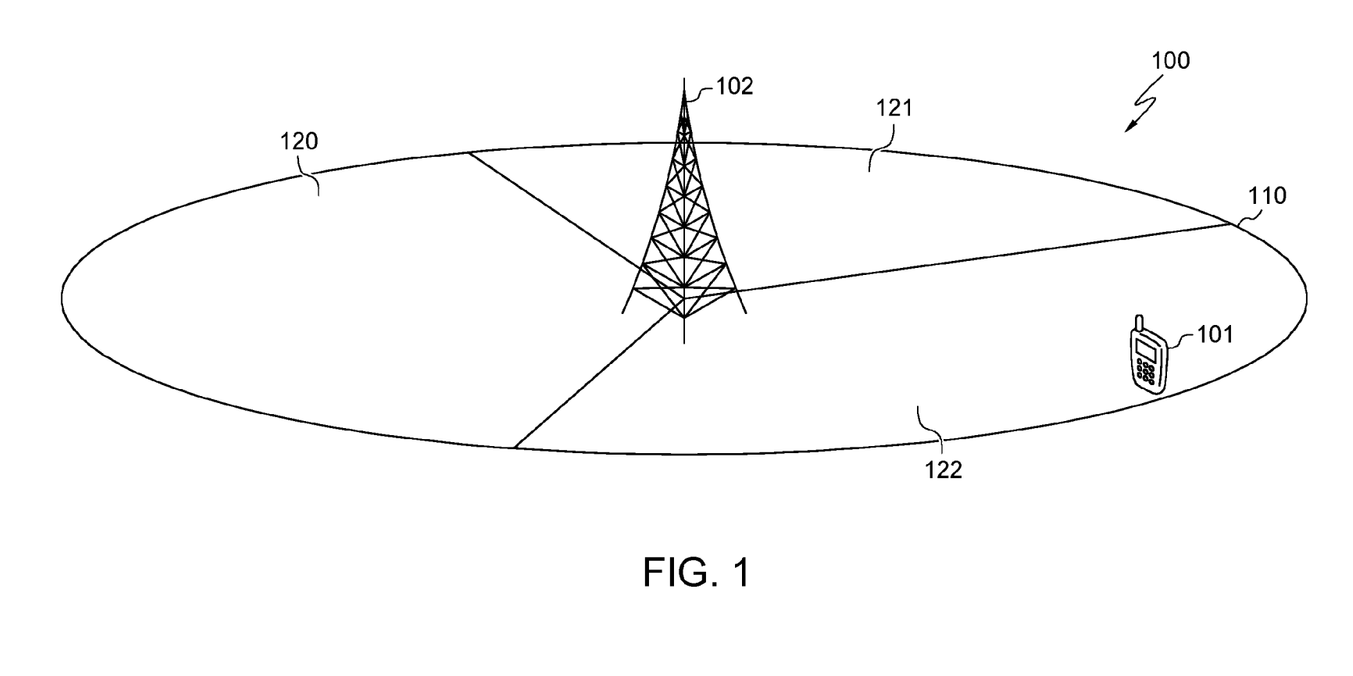
FIG. 1 is a diagram of a wireless communication system, in accordance with various embodiments.

FIG. 1 is a diagram illustrating a wireless communication system, in accordance with various embodiments. For example, the wireless communication system 100 may be a cellular system that enables a wireless communication device 101 to communicate with one or more base stations 102 (e.g., evolved Node B (eNB), access point, transmission node, RRU, RRH, nodes in distributed antenna systems (DAS), donor node controlling relay, base transceiver state (BTS), multi-standard radio (MSR)) over one or more wireless channels using a wireless communication technique (e.g., mmWave, time division duplex (TDD), frequency division duplex (FDD)).

The wireless communication device 101 may be a non-stationary device. For example, the wireless communication device 101 may include mobile radiotelephones, tablet computers, lap top computers, and other devices that may communicate over a wireless channel with the base station 102. For consistency and simplicity, the wireless communication device 101 is subsequently referred to as user equipment (UE). The UE includes a transceiver and control circuitry coupled to a plurality of antenna elements through which beamforming may be accomplished.

The base station 102 may include a plurality of antennas coupled to a transceiver as well as control circuitry to control the base station operation. FIG. 1 and subsequent figures show only a single antenna for purposes of simplicity and clarity. However, a person of ordinary skill in the art would realize that for beamforming to be accomplished, the base station 102 comprises a plurality of antenna elements.

The base station 102 has a fixed location and may be part of a stationary base station network including other base stations that are coupled to a larger network. For example, the base station 102 may be part of a wired network that is coupled to the Internet. The UE 101 may then access the larger network by communicating over the wireless communication channels with the base station 102.

The base station 102 communicates over an area 110 substantially surrounding the base station antenna. This area 110 is typically referred to as a cell 110 and may comprise one or more sectors 120, 121, 122. While three different sectors 120, 121, 122 are shown making up the cell 110 of FIG. 1, other embodiments may comprise different sector quantities.

While a plurality of UEs 101 may be within the cell 110 generated by the base station 102, not all of the UEs 101 may be in contact with the base station 102. UE 1.01 that is registered with the base station or is attempting to register with the base station 102 may be defined as "served UEs". Other UEs may be registered with other, neighboring base stations.

Figure 2:
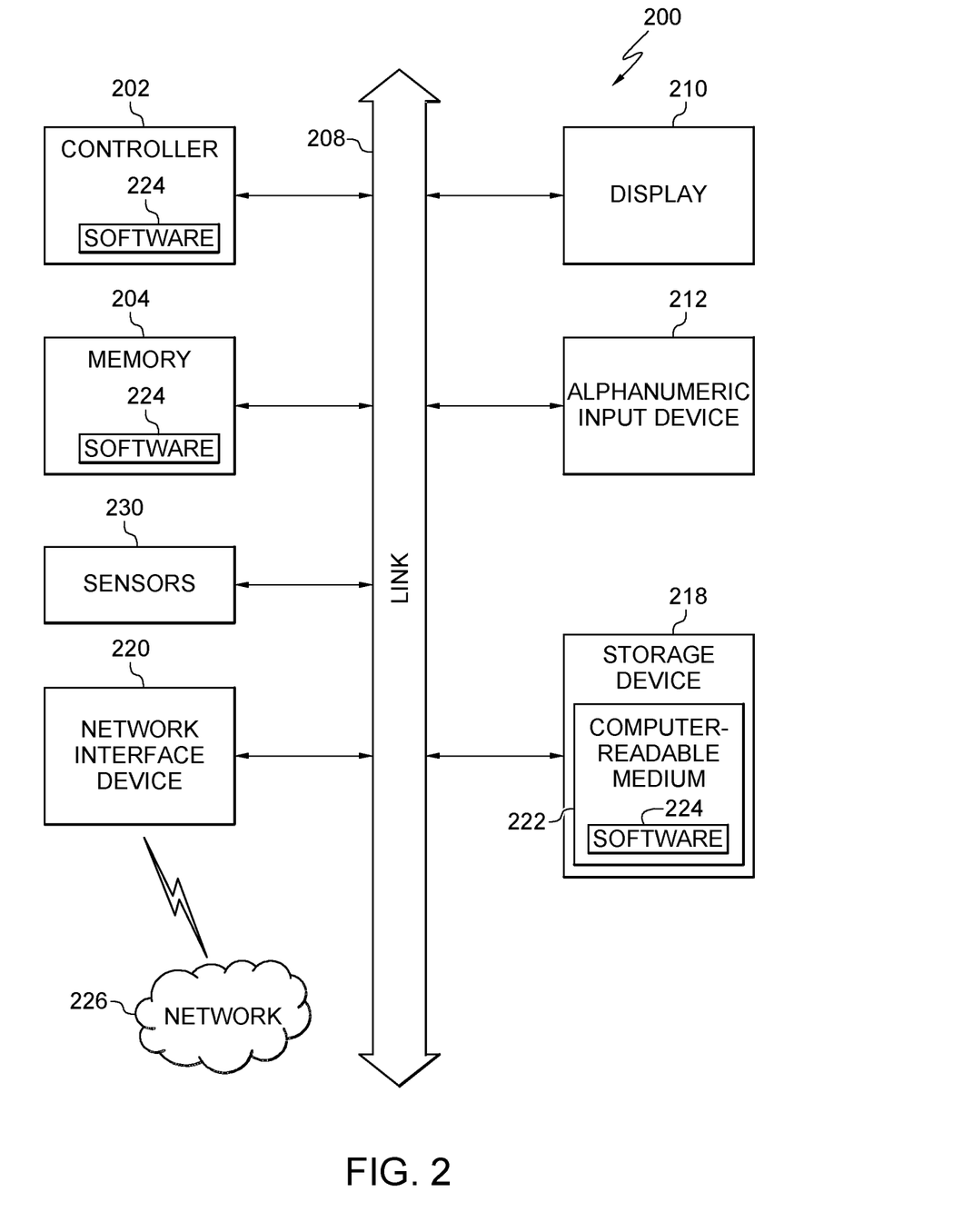
FIG. 2 is a block diagram of a wireless communication device, in accordance with various embodiments.

FIG. 2 is a block diagram of a wireless communication device 200, in accordance with various embodiments. The wireless communication device 200 may be in the example form of the UE (e.g., see FIG. 1), a cellular base station (e.g., eNodeB, eNB), an access point (AP), or some other wireless station. For example, the wireless communication device 200 may be a computer, a personal computer (PC), a tablet PC, a hybrid tablet, a personal digital assistant (PDA), or part of any device configured to execute instructions (sequential or otherwise) that specify actions to be taken by the wireless communication device 200.

The term "processor-based system" shall be taken to include any set of one or more communication apparatuses that are controlled by or operated by processing circuitry (e.g., a controller) to individually or jointly execute instructions to perform any one or more of the methodologies discussed herein. A set or sequence of instructions may be executed to cause the communication apparatus to perform any one of the methodologies discussed herein, according to an example embodiment.

The wireless communication device 200 may include at least one controller 202 (e.g., a central processing unit (CPU), a graphics processing unit (GPU) or both, processor cores, compute nodes, etc.), and memory 204 that communicate with each other via a link 208 (e.g., bus). If the wireless communication device 200 is a UE, it may further include a display device 210 (e.g., video, LED, LCD) and an alphanumeric input device 212 (e.g., a keypad, keyboard). In one embodiment, the display device 210 and the input device 212 may be incorporated in one unit as a touch screen display.

The wireless communication device 200 may additionally include a mass storage device 216 (e.g., a drive unit, hard disk drive, solid state drive, optical drive) and a network interface device 220. The network interface device 220 may include one or more radios (e.g., transmitters and receivers (transceivers)) coupled to a plurality of antenna elements in order to communicate over a wireless network channel 226, as illustrated in FIG. 1. The one or more radios may be configured to operate using one or more communication techniques including the method for channel-state information determination disclosed herein. The network interface device 220 may also include a wired network interface (e.g., X2 backhaul link).

The storage device 216 includes a computer-readable medium 222 on which is stored one or more sets of data structures and instructions 224 (e.g., software) embodying or utilized by any one or more of the methodologies or functions described herein. The instructions 224 may also reside, completely or at least partially, within the memory 204 and/or within the controller 202 during execution thereof by the communication apparatus 200. A plurality of sets preceding codebook elements including a rank information and a corresponding preceding matrix index may be stored in the memory of the UE While the computer-readable medium 222 is illustrated in an example embodiment to be a single medium, the term "computer-readable medium" may include a single medium or multiple media (e.g., a centralized or distributed database, and/or associated caches and servers) that store the one or more instructions 224.

The LIE may additionally include sensors 230 such as an accelerometer, a global positioning system (GPS) receiver, a gyroscope, and/or a compass to provide sensory input to the processor 202. These sensors 230 may be used to determine a velocity (i.e., magnitude and direction) of the UE.

The UE described herein may implement a MIMO antenna configuration. One example of such a configuration is illustrated in FIG. 3.

Figure 3:
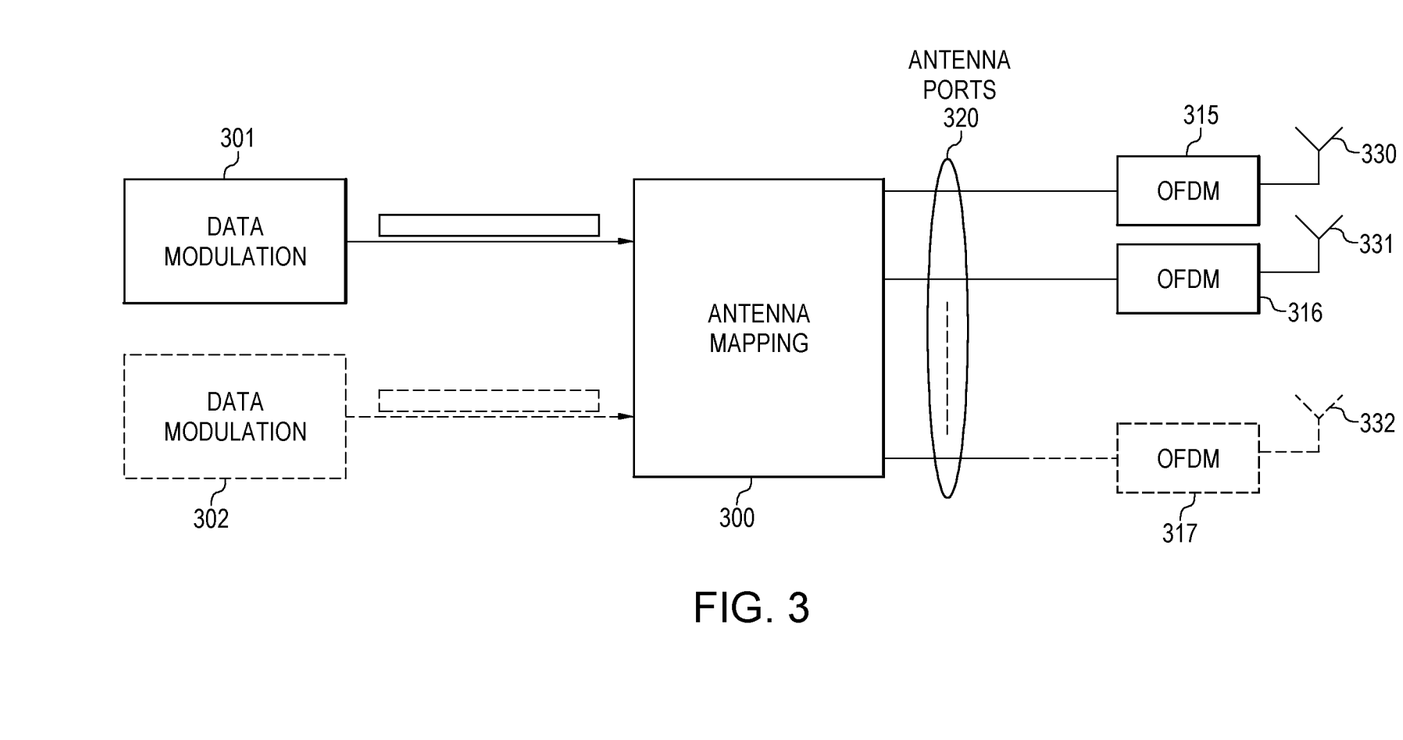
FIG. 3 is a block diagram of a MIMO antenna system, in accordance with various embodiments.

FIG. 3 is a block diagram of a MIMO antenna system, in accordance with various embodiments. The MIMO system is an advanced antenna technique to improve spectral efficiency and thereby boosting the overall system capacity. The MIMO technique uses a commonly known notation (M×N) to represent MIMO configuration in terms number of transmit (M) and receive antennas (N). The common MIMO configurations used for various technologies are: (2×1), (1×2), (2×2), (4×2), (8×2) and (2×4), (4×4), (8×4).

MIMO antenna systems can increase data carrying capacity of wireless systems. MIMO can also be used for achieving diversity gain, spatial multiplexing gain and beamforming gain. For these reasons, MIMO is an integral part of the $3^{rd}$ and $4^{th}$ generation wireless systems.

FIG. 3 illustrates the general antenna mapping block 300 that maps the outputs of the data modulation blocks 301, 302 to the different antenna ports 320. The input to the antenna mapping block 300 thus comprises modulation symbols (e.g., QPSK, 16QAM, 64QAM, 256QAM) corresponding to the one or two transport blocks. To be more specific, there is one transport block per transmission time interval (TTI) except for spatial multiplexing, in which case there may be two transport blocks per TTI. The output of the antenna mapping block 300 is a set of symbols for each antenna port 320. The symbols of each antenna port 320 are subsequently applied to respective orthogonal frequency division multiplexer (OFDM) modulators 315-317. In other words, the symbols are mapped to the basic OFDM time-frequency grid corresponding to that particular antenna port. The OFDM modulators 315-317 then transmit the symbols from their respective antenna 330-332.

Massive MIMO is a relatively recent research field in wireless communication where large numbers of antenna elements are deployed at the transmitter. Larger numbers of user terminals can be supported by combining massive MIMO technology with conventional time and frequency division multiplexing via orthogonal frequency division multiplexing. For this purpose, 3GPP may increase the number of antennas at the base station up to 16/32/64.

Figure 4:
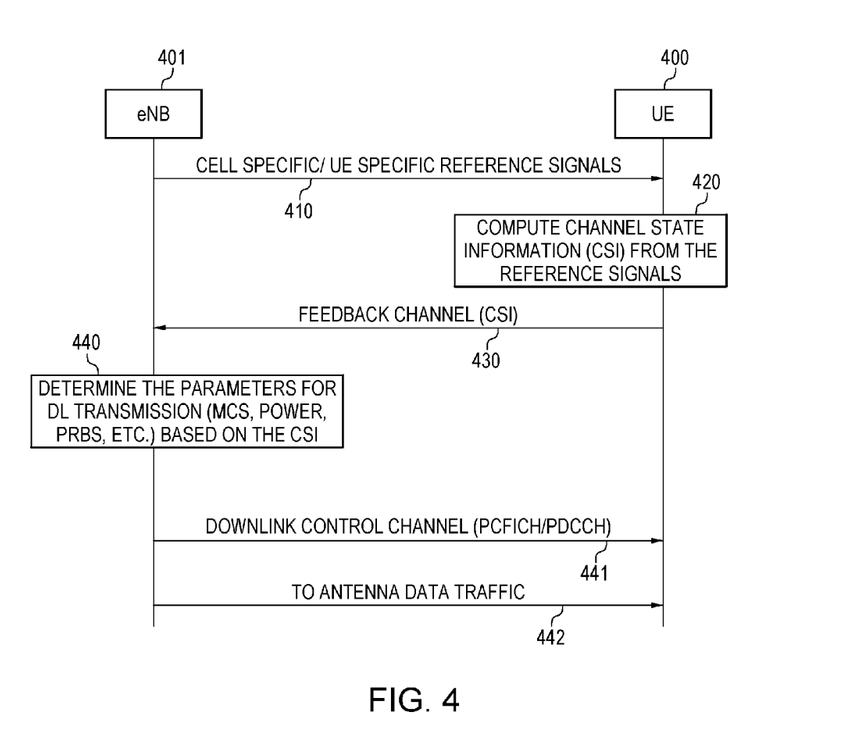
FIG. 4 is a flow diagram showing the message sequence between a base station and a UE, in accordance with various embodiments.

FIG. 4 is a flow diagram showing the message sequence between a base station 401 and a UE 400, in accordance with various embodiments. The base station (e.g., eNB) 401 initially transmits cell specific and UE specific reference signals 410 to the UE 400. The reference signals may include signals such as pilot signals.

The UE 400 uses those reference signals to determine condition of the channel as indicated by the channel-state information (CSI) 420. The CSI may include such elements as, for example, channel quality indicator (CQI), precoding matrix index (PMI), and rank information (RI).

The CSI information is transmitted back to the eNB 401 over a feedback channel such as physical uplink control channel (PUCCH) for periodic reporting or physical uplink shared channel (PUSCH) for aperiodic reporting. The eNB 401 may then determine the parameters for downlink (DL) transmission (i.e., from the eNB to the UE). These parameters may include transmission power, modulation coding scheme (MCS), and physical resource blocks (PRBs).

The eNB 401 then transmits these parameters to the UE 400 over the DL control channel 441 (e.g., physical downlink control channel (PDCCH). However, before sending PDCCH, the eNB sends control format indicator information on PCFICH which is a physical channel providing the UEs with information necessary to decode the set of downlink control channels (PDCCH). After that, the eNB 401 may then transmit data traffic 442 to the UE 400.

Downlink reference signals are predefined signals occupying specific resource elements within the downlink time-frequency grid. The LTE specification includes several types of downlink reference signals that are transmitted in different ways and used for different purposes by the receiving terminal. For example, downlink reference signals may include cell-specific reference signals (CRS), demodulation-reference signals (DM-RS), and channel-state information-reference signals (CSI-RS).

Cell-specific reference signals are transmitted in every downlink subframe and in every resource block in the frequency domain, thus covering the entire cell bandwidth. The cell-specific reference signals can be used by the UE for channel estimation for coherent demodulation of any downlink physical channel except for PMCH and for PDSCH in the case of transmission modes 7, 8, or 9. The cell-specific reference signals may also be used by the terminal to acquire channel-state information. Terminal measurements on cell-specific reference signals may be used as the basis for cell-selection and handover decisions.

Demodulation reference signals may also be referred to as UE-specific reference signals and are specifically intended to be used by UEs for channel estimation for PDSCH in the case of transmission modes 7,8,9 or 10. The label "UE-specific" relates to the fact that each demodulation reference signal is intended for channel estimation by a single terminal. That specific reference signal is then only transmitted within the resource blocks assigned for PDSCH transmission to that terminal.

CSI-reference signals are specifically intended to be used by UEs to acquire CSI in the case when demodulation reference signals are used for channel estimation. CSI-reference signals have a significantly lower time/frequency density thus implying less overhead as compared to the cell-specific reference signals.

In an LTE system, the downlink control channel (PDCCH) carries information about the scheduling grants. Typically this comprises a number of scheduled MIMO layers, transport block sizes, modulation for each code word, parameters related to HARQ, sub-band locations, and also a respective precoding matrix index corresponding to each sub-band.

Typically, the following information is transmitted by means of the downlink control information (DCI) format: localized/distributed VRB assignment flag, resource block assignment, modulation and coding scheme, HARQ process number, new data indicator, redundancy version, TPC command for PUCCH, downlink Assignment, Index, precoding matrix index, and number of layers. Note that all DCI formats may not use all the information as shown above. In general, the contents of PDCCH depends on transmission mode and DCI format.

Also in an LTE system, the uplink control channel carries information about hybrid automatic repeat request-acknowledge (HARQ-ACK) information corresponding to the downlink data transmission, and channel state information. The CST typically comprises RI, CQI, and PMI. Either PUCCH or PUSCH can be used to carry this information. Note that the PUCCH reporting is periodic and the periodicity of the PUCCH is configured by the higher layers, while the PUSCH reporting is aperiodic. Also note that there are various modes for PUCCH and PUSCH and in general it depends on the transmission mode and the formats is configured via higher layer signaling.

Ideal linear precoding uses full CSI at the transmitter. This may be possible only for TDD based systems but not practical for FDD based systems. Thus, codebook based precoding allows the receiver to explicitly identify a precoding matrix/vector based on a codebook stored in the UE that is used for transmission.

In the 3GPP LTE standard, separate codebooks are defined for various combinations of the number of transmit antennas and the number of transmission layers. The latter is also referred to as rank information (RI). For example, in 3GPP Release 8, a total of 64 precoding vectors and matrices are defined as shown in Table 1 for 4 transmit antennas. Also for each rank in the codebook for the scenarios of RI=1, 2, 3 and 4, 16 elements per rank are defined. Table 1 is shown only for purposes of illustration and does not limit the present embodiments to any certain information contained therein. The 3GPP standard does not specify the criteria for the UE to use to compute the RI and/or the optimum precoding matrices/vectors.

TABLE 1

| Code book index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{132\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |

TABLE 1-continued

| Code book index | $u_n$ | Number of layers $v$ | | | |
|---|---|---|---|---|---|
| | | 1 | 2 | 3 | 4 |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In a conventional CSI selection, an exhaustive search is performed of all of the precoding codebook elements. For example, the UE estimates the channel, computes the post-processing signal-to-interference-plus-noise ratio (SINR) for each entity in the precoding codebook, and the link quality metric (LQMs) (e.g., mutual information, capacity) for each entity in the codebook is computed. Then the precoding matrix index and the corresponding RI that maximizes the LQM is chosen.

For example, using mutual information in closed-loop SM, the UE needs to estimate a suitable CSI, (i.e., CQI/PMI/RI), in order to maximize the throughput and simultaneously maintain the block-error-rate (BLER) constraint that can be mathematically described by a joint (integer) optimization problem:

$$\max_{CQI,PMI,RI} \text{Throughput}(CQI, PMI, RI) \quad (1)$$

Unfortunately, this joint (discrete/integer) optimization problem does not have any closed-form solution. Hence, one normally tries to estimate a suitable PMI/RI (independent of CQI). Thereafter, a suitable CQI is estimated accordingly for the chosen PMI and RI. For example, consider a single-cell scenario having perfect time and synchronization, a received system model for (closed-loop) spatial multiplexing (SM) per sub-carrier (post-FFT) can be shown as:

$$Y = \underbrace{R_r^{1/2} H_{HD} R_r^{1/2}}_{H} W_{PMI} x + n \quad (1)$$

$$= H W_{PMI} x + n,$$

where, $Y \in C^{N_r \times 1}$ corresponds to a received signal vector, and $H \in C^{N_r \times N_t}$ describes an overall channel matrix incorporating the receiver and transmitter spatial correlation $R_r \in C^{N_r \times N_r}$ and $R_t \in C^{N_t \times N_t}$, respectively. A complex zero-mean Gaussian noise vector $n \in C^{N_r \times 1}$ is having covariance $R_n$. An unknown complex data/symbol vector is denoted by $x \in C^{N_L \times 1}$ (having normalized power $E\{xx^H\} = R_x = I$) corresponding to M-QAM (e.g., 64-QAM) constellation. A (complex) precoder $W_{PMI} \in C^{N_t \times N_L}$ is selected from a given/known codebook $\Pi$ having $N_\Pi$ number of precoders (where, PMI={0,1, ... $N_\Pi-1$}) for a given rank≤min{$N_r,N_t$}

The post-processing SINR per $i^{th}$ spatial layer for a given PMI, assuming linear-MMSE detector employed at the receiver, reads $$SINR_i = \frac{1}{[(W_{PMI}^H H^H R_n^{-1} H W_{PMI} + I_{N_L})^{-1}]_{i,i}} - 1, \quad (2)$$

where $[A]_{i,i}$ corresponds to an $i^{th}$ diagonal element of a matrix A.

In order to estimate a suitable PMI/RI, a link-quality metric (LQM) is computed. The LQM (e.g., mean mutual information) may be denoted as mMI (per sub-band/wide-band) and is computed as given below:

$$mMI(PMI, RI) = \left(\frac{1}{K \cdot \text{rank}}\right) \sum_{k=1}^{K} \sum_{i=1}^{RI=rank} I(SINR_i[k]), \quad (3)$$

Where, I (SINR$_i$[k]) is a mutual information that is a function of post-processing SINR$_i$ [k] as given in Table 2 for $i^{th}$ spatial layer and $k^{th}$ resource-element. The number of resource-elements employed for the computation of the aforementioned LQM is given by a parameter K (depending on the wide-band/sub-band PMI estimate).

TABLE 2

| Modulation Alphabet A | Mutual Information per symbol |
|---|---|
| 4-QAM | $I(SINR_i) = J(\sqrt{4SINR_i})$ |
| 16-QAM | $I(SINR_i) \approx (\frac{1}{2})J(0.8818\sqrt{SINR_i}) +$ $(\frac{1}{4})J(1.6764\sqrt{SINR_i}) + (\frac{1}{4})J(0.9316\sqrt{SINR_i})$ |
| 64-QAM | $I(SINR_i) \approx (\frac{1}{3})J(1.1233\sqrt{SINR_i}) +$ $(\frac{1}{3})J(0.4381\sqrt{SINR_i}) + (\frac{1}{3})J(0.4765\sqrt{SINR_i})$ |

$$J(a) \approx \begin{cases} -0.04210610\ a^3 + 0.209252\ a^2 - 0.00640081\ a, & 0 < a < 1.6363 \\ 1 - \exp(0.00181491\ a^3 - 0.142675\ a^2 - \\ \quad 0.08220540\ a + 0.0549608), & 1.6363 < a < \infty \end{cases}.$$

After having the estimate of mMI (per sub-band/wide-band), the PMI and RI may be estimated jointly employing unconstrained optimization which can be given as:

$$\max_{PMI,RI} mMI(PMI, RI) \quad (5)$$

In a capacity approach, instead of using the LQM, the capacity information is used to maximize the capacity for every combination of RI, PMI as follows:

$$\text{capacity}(PMI, RI) = \left(\frac{1}{K \cdot \text{rank}}\right) \sum_{k=1}^{K} \sum_{i=1}^{RI=rank} \log_2(1 + SINR_i[k]). \quad (6)$$

Note that the received SINR at the output of the MIMO detector (MMSE, MED etc.) is a function of channel matrix H, precoding matrix, the noise power spectral density, and the co-channel interference power.

The present embodiments reduce the complexity in finding CSI (e.g., rank information, precoding matrix index, channel quality indicator) using an iterative search method (incremental/decremental search) for finding the rank information and associated precoding matrix index, thereby avoiding the conventional exhaustive search for finding this information. The present embodiments are based upon the premise that the RI changes very little during normal cellular communications. In fact, the RI mostly changes in steps of ±1 for most Doppler frequency ranges unless the UE is moving at a velocity greater than a predetermined threshold relative to the eNB (e.g., highway velocities). Thus, in the present embodiments, the prior RI of past reports is used to compute the RI for future use.

Figure 5:
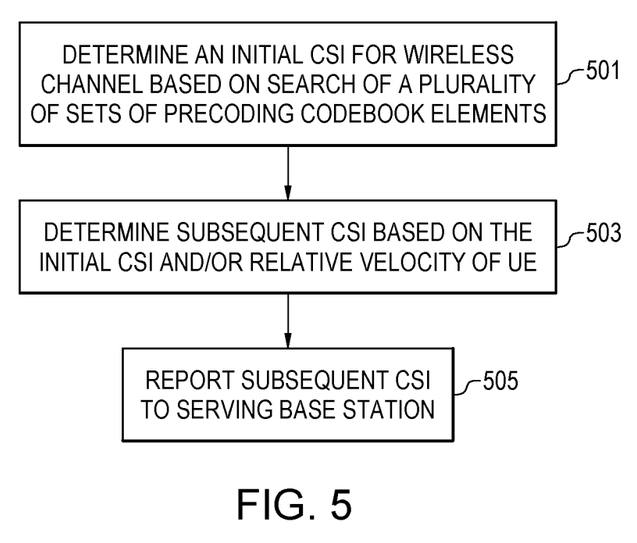
FIG. 5 is a flowchart showing a method for channel-state information determination in wireless networks, in accordance with various embodiments.

FIG. 5 is a flowchart showing a method for channel-state information determination in wireless networks, in accordance with various embodiments. In block 501, an initial channel-state information is determined for a wireless channel based on a search of a plurality of sets of precoding codebook elements stored in a multiple input multiple output UE. Each set of the plurality of sets precoding codebook elements may include a rank information and a corresponding precoding matrix index such that determining the initial channel-state information comprises determining the rank information and the corresponding precoding matrix index for the wireless channel.

In block 503, a subsequent channel-state information is determined based on the initial channel-state information. The plurality of sets of precoding codebook elements may be stored in a predetermined order in the UE and determining the subsequent channel-state information may include selecting the set of precoding codebook elements, including the subsequent rank information, that is immediately previous to the set of precoding codebook elements including the initial channel-state information. In another embodiment, determining the subsequent channel-state information may include selecting the set of precoding codebook elements, including the subsequent rank information, that is immediately subsequent to the set of precoding codebook elements including the initial channel-state information.

In yet another embodiment, a velocity of the UE relative to the serving base station may be determined (e.g., using a GPS receiver) and the subsequent channel-state information may be determined based on the search of the plurality of sets of precoding codebook elements or the initial channel-state information when the velocity is less than a threshold (e.g., less than highway speed). The subsequent channel-state information may also be determined (e.g., see FIG. 6) based on the initial channel-state information when the velocity is greater than the threshold. In block 505, the subsequent channel-state information may be reported to the serving base station over the wireless channel.

Figure 6:
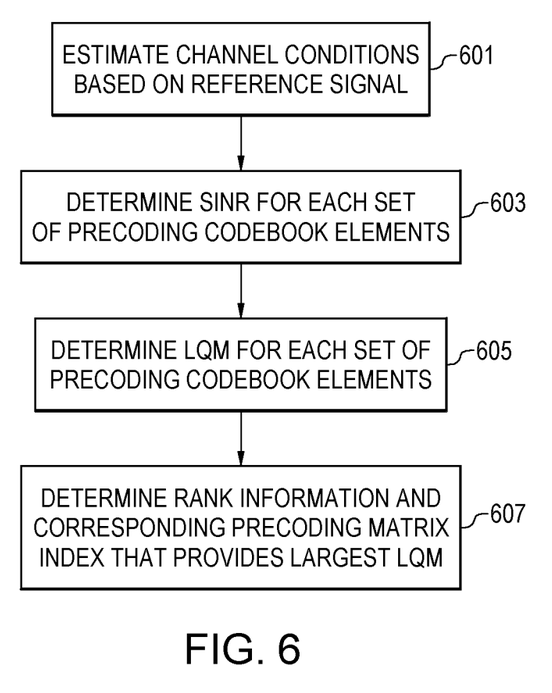
FIG. 6 is a flowchart showing another method for channel-state information determination in wireless networks, in accordance with various embodiments.

FIG. 6 is a flowchart showing a method for channel-state information determination in wireless networks, in accordance with various embodiments. This method illustrates one method for determining the initial channel-state information.

In block 601, the channel conditions are estimated based on reference signals transmitted over the channel. This estimating may be accomplished based on pilot signals and data signals. In block 603, a signal-interference plus noise ratio (SINK) is determined for each set of precoding codebook elements of the plurality of sets of precoding codebook elements. In block 605, a link quality metric (LQM) is determined for each set of precoding codebook elements of the plurality of sets of precoding codebook elements. In block 607, the rank information and the corresponding precoding matrix index are determined that provide a largest LQM from a plurality of LQMs as discussed previously.

The methods for CSI determination may provide advantages over the convention exhaustive search method for determining CSI. For example, the percentage degradation with respect to full search is zero, while the complexity can be reduced significantly. Battery life on the UE side is improved since the power used to compute RI/PMI is less compared to the conventional exhaustive search method. The UE hardware resources (e.g., memory and processing units) can be partly relieved to allow the UE to efficiently execute additional procedures (e.g. inter-RAT measurements) in parallel with the CSI estimation.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The Abstract is provided with the understanding that it will not be used to limit or interpret the scope or meaning of the claims. The following claims are hereby incorporated into the detailed description, with each claim standing on its own as a separate embodiment.

What is claimed is:

1. A method comprising:
   determining in a multiple input multiple output user equipment (UE) an initial channel-state information for a wireless channel based on a search of a plurality of sets of precoding codebook elements stored in the UE, each set of the plurality of sets of precoding codebook elements comprises a rank information and a corresponding precoding matrix index, wherein determining the initial channel-state information comprises:
   estimating channel conditions based on reference signals transmitted over the channel;
   determining a signal-interference plus noise ratio (SINR) for each set of precoding codebook elements of the plurality of sets of precoding codebook elements;
   determining a link quality metric (LQM) for each set of precoding codebook elements of the plurality of sets of precoding codebook elements; and determining the rank information and the corresponding precoding matrix index that provides a largest LQM from a plurality of LQMs; and determining a subsequent channel-state information based on the initial channel-state information.

2. The method of claim 1, wherein the respective rank information of each of the plurality of sets of precoding codebook elements are stored in a predetermined order and determining the subsequent channel-state information comprises selecting the rank information that is immediately previous to the rank information in the set of precoding codebook elements including the initial channel-state information.

3. The method of claim 1, wherein the respective rank information of each of the plurality of sets of precoding codebook elements are stored in a predetermined order and determining the subsequent channel-state information comprises selecting the rank information that is immediately subsequent to the rank information in the set of precoding codebook elements including the initial channel-state information.

4. The method of claim 1, wherein estimating the channel based on reference signals comprises estimating the channel based on pilot signals and data signals.

5. The method of claim 1, further comprising reporting the subsequent channel-state information to a base station over the wireless channel.

6. The method of claim 1, further comprising forming a subset of the plurality of sets of precoding codebook elements comprising a quantity of precoding codebook elements that is less than the plurality of sets of precoding codebook elements.

7. The method of claim 6, wherein the subsequent channel-state information is part of a set of precoding codebook elements that is selected from the subset of sets of the precoding codebook elements.

8. The method of claim 1, further comprising:
determining a velocity of the UE relative to a base station communicating with the UE over the wireless channel; and
determining the subsequent channel-state information based on one of the search of the plurality of sets of precoding codebook elements stored in the UE or the initial channel-state information when the velocity is less than a threshold.

9. The method of claim 1, further comprising:
determining a velocity of the UE relative to a base station communicating with the UE over the wireless channel; and
determining the subsequent channel-state information based on the initial channel-state information when the velocity is greater than a threshold.

10. A user equipment (UE) comprising:
a radio coupled to a plurality of antenna elements, wherein the radio is a multiple input multiple output (MIMO) radio; and
a controller, coupled to the radio and antenna elements, configured to determine a first rank information for a wireless channel based on a search of a plurality of precoding codebook elements stored in a multiple input multiple output UE and determine a second rank information based on the first rank information, the controller is further configured to:
estimate a channel condition of the wireless channel based on reference symbols and data received over the wireless channel;

determine a signal-to-interference plus noise ratio (SINR), for a first precoding matrix index corresponding to the first rank information, based on the channel condition;
determine a mutual information or capacity of the wireless channel based on the SINR;
select the second rank information and corresponding second precoding matrix index based on the mutual information or the capacity; and
report the second precoding matrix index, the second rank information, and a channel quality indicator, associated with the second precoding matrix index, to a base station communicating with the UE over the wireless channel.

11. The user equipment of claim 10, wherein the controller is further configured to report the first and second rank information and respective corresponding precoding matrix indices to the base station over the wireless channel.

12. The user equipment of claim 11, wherein the controller is further configured to report a third rank information, subsequent to the second rank information, to the base station based on the search of the plurality of precoding codebook elements.

13. A user equipment (UE) comprising:
a radio coupled to a plurality of antenna elements, wherein the radio is a multiple input multiple output (MIMQ) radio; and
a controller, coupled to the radio and antenna elements, configured to determine a first rank information for a wireless channel based on a search of a plurality of precoding codebook elements stored in a multiple input multiple output UE and determine a second rank information based on the first rank information, wherein the controller is further configured to:
estimate a channel condition of the wireless channel from reference symbols and data received over the wireless channel;
determine a signal-to-interference plus noise ratio (SINR), for each precoding matrix index corresponding to each respective precoding codebook element of the plurality of precoding codebook elements, based on the channel condition; determine a mutual information or capacity of the wireless channel based on the SINR; select a precoding matrix index based on the mutual information or the capacity; and
report rank information and channel quality indicator, associated with the selected precoding matrix index, to a base station communicating with the UE over the wireless channel.

14. A non-transitory computer-readable storage medium that stores instructions for execution by processing circuitry of a multiple input multiple output user equipment (UE) to perform operations that:
determine an initial channel-state information for a wireless channel based on a search of a plurality of sets of precoding codebook elements stored in the UE, each set of the plurality of precoding codebook elements is associated with a respective precoding matrix index and associated rank information, the plurality of sets of precoding codebook elements stored in a predetermined order, the operations further report the precoding matrix index associated with a subsequent channel-state information: and
determine the subsequent channel-state information based on the initial channel-state information, wherein the subsequent channel-state information is associated with a first set of a plurality of precoding codebook elements that precedes a second set of a plurality of precoding codebook elements comprising the initial channel-state information or succeeds the second set of the plurality of precoding codebook elements, in the predetermined order.

15. The non-transitory computer-readable storage medium of claim 14, wherein the operations further determine a velocity of the UE, relative to a base station communicating with the UE over the wireless channel, and select a rank information based on the velocity of the UE.

* * * * *

UNITED STATES PATENT AND TRADEMARK OFFICE
CERTIFICATE OF CORRECTION

PATENT NO. : 9,742,480 B1  
APPLICATION NO. : 15/164373  
DATED : August 22, 2017  
INVENTOR(S) : Nammi et al.

Page 1 of 2

It is certified that error appears in the above-identified patent and that said Letters Patent is hereby corrected as shown below:

In the Specification

In Column 1, Line 25, delete "(CST)" and insert --(CSI)-- therefor

In Column 1, Line 27, delete "precoding," and insert --precoding-- therefor

In Column 1, Line 28, delete "identity" and insert --identify-- therefor

In Column 1, Line 35, delete "(PMT)," and insert --(PMI),-- therefor

In Column 1, Line 43, delete "MEMO," and insert --MIMO,-- therefor

In Column 3, Line 8, delete "1.01" and insert --101-- therefor

In Column 3, Line 65, delete "preceding" and insert --precoding-- therefor

In Column 3, Line 66, delete "preceding" and insert --precoding-- therefor

In Column 3, Line 67, after "UE", insert --.--

In Column 4, Line 7, delete "LIE" and insert --UE-- therefor

In Column 6, Line 13, delete "Assignment," and insert --Assignment-- therefor

In Column 6, Line 23, delete "CST" and insert --CSI-- therefor

In Column 7, Line 33, delete "not." and insert --not-- therefor

Signed and Sealed this  
Fifth Day of January, 2021

Andrei Iancu  
*Director of the United States Patent and Trademark Office*

CERTIFICATE OF CORRECTION (continued)
U.S. Pat. No. 9,742,480 B1

In Column 7, Line 42-43, delete "$Y = \underbrace{R_r^{1/2} H_{HD} R_r^{1/2}}_{H} W_{PMI} x + n$" and insert --$Y = \underbrace{\mathbf{R}_r^{1/2} \mathbf{H}_{IID} \mathbf{R}_t^{1/2}}_{\mathbf{H}} \mathbf{W}_{PMI} \mathbf{x} + \mathbf{n}$-- therefor In Column 7, Line 49, delete "$H \in C^{N_r \times N_r}$" and insert --$H \in \mathbb{C}^{N_r \times N_t}$-- therefor In Column 7, Line 50-51, delete "$R_r \in \mathcal{N}^{N_r \times N_r}$" and insert --$R_r \in \mathbb{C}^{N_r \times N_r}$-- therefor In Column 7, Line 53, delete "$x \in \mathcal{N}^{N_i \times 1}$" and insert --$x \in \mathbb{C}^{N_L \times 1}$-- therefor In Column 7, Line 56, delete "$W_{PMI} \in \mathcal{N}^{N_i \times N_L}$" and insert --$W_{PMI} \in \mathbb{C}^{N_t \times N_L}$-- therefor In Column 7, Line 58, after "rank≤min{Nr,Nt}", insert --.--

In Column 7, Line 63-65, delete "$SINR_i = \frac{1}{[(W_{PMI}^H H^H R_n^{-1} H W_{PMI} + I_{N_L})^{-1}]_{i,i}} - 1,$" and insert --$SINR_i = \frac{1}{\left[\left(\mathbf{W}_{PMI}^H \mathbf{H}^H \mathbf{R}_n^{-1} \mathbf{H} \mathbf{W}_{PMI} + \mathbf{I}_{N_L}\right)^{-1}\right]_{i,i}} - 1,$-- therefor In Column 8, Line 29, delete "wide-hand/sub-hand" and insert --wide-band/sub-band-- therefor In Column 8, Line 63, delete "MED" and insert --MLD-- therefor In Column 9, Line 60, delete "(SINK)" and insert --(SINR)-- therefor In the Claims In Column 12, Line 63, in Claim 14, delete "information:" and insert --information;-- therefor